US010287413B2

(12) United States Patent
Acharya et al.

(10) Patent No.: US 10,287,413 B2
(45) Date of Patent: May 14, 2019

(54) THERMOPLASTIC POLYMER COMPOSITE CONTAINING SOFT, FERROMAGNETIC PARTICULATE MATERIAL AND METHODS OF MAKING THEREOF

(71) Applicant: 3M INNOVATIVE PROPERTIES COMPANY, St. Paul, MN (US)

(72) Inventors: Bharat R. Acharya, Woodbury, MN (US); Charles L. Bruzzone, Woodbury, MN (US); Michael S. Graff, Woodbury, MN (US); Derek J. Dehn, Maplewood, MN (US); Clint J. Novotny, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 100 days.

(21) Appl. No.: 15/382,834

(22) Filed: Dec. 19, 2016

(65) Prior Publication Data

US 2018/0174723 A1    Jun. 21, 2018

(51) Int. Cl.
*C08K 3/34* (2006.01)
*H01F 1/26* (2006.01)

(52) U.S. Cl.
CPC .............. *C08K 3/34* (2013.01); *H01F 1/26* (2013.01); *C08K 2201/01* (2013.01)

(58) Field of Classification Search
None
See application file for complete search history.

(56) References Cited

U.S. PATENT DOCUMENTS

| 4,411,807 A | 10/1983 | Watanabe et al. |
| 4,791,037 A | 12/1988 | Anderman |

(Continued)

FOREIGN PATENT DOCUMENTS

| CN | 102832005 A | 12/2012 |
| DE | 4406060 | 2/1994 |

(Continued)

OTHER PUBLICATIONS

Fatou et al. (Effects of MW on the Melting Temperature and Fusion of Polyethylene article), J. Phys. Chem., v69(8), 1965, pp. 417-428.*

(Continued)

*Primary Examiner* — Kevin M Bernatz
(74) *Attorney, Agent, or Firm* — James A. Baker; Jeffery S. Kollodge (57) ABSTRACT

The present disclosure relates to polymer composites that include a thermoplastic polymer, network structure and a soft, ferromagnetic particulate material. The polymer composites may be used, for example, as magnetic flux field directional materials. The present invention also relates to methods of making the polymer composites, e.g. polymer composite sheets, of the present disclosure. In one embodiment, the present disclosure provides a polymer composite including a thermoplastic polymer, network structure; and a soft, ferromagnetic particulate material distributed within the thermoplastic polymer, network structure. The weight fraction of soft, ferromagnetic particulate material may be between 0.80 and 0.98, based on the total weight of the polymer composite and/or the thermoplastic polymer may have a number average molecular weight between $5 \times 10^4$ g/mol to $5 \times 10^7$ g/mol.

23 Claims, 1 Drawing Sheet

50 um

(56) References Cited

U.S. PATENT DOCUMENTS

| | | | |
|---|---|---|---|
| 5,068,147 A * | 11/1991 | Hori | B82Y 25/00 |
| | | | 428/336 |
| 5,196,262 A | 3/1993 | Schwarz | |
| 5,510,412 A | 4/1996 | Suzuki et al. | |
| 5,567,757 A | 10/1996 | Szczepanski | |
| 5,726,106 A * | 3/1998 | Klason | D01F 9/08 |
| | | | 264/104 |
| 5,827,445 A | 10/1998 | Yoshida | |
| 5,828,940 A | 10/1998 | Learman | |
| 6,171,723 B1 | 1/2001 | Loch | |
| 6,524,742 B1 | 2/2003 | Emanuel | |
| 6,558,840 B1 | 5/2003 | Hikmet | |
| 9,105,382 B2 | 8/2015 | Heikkila | |
| 2002/0078793 A1 | 6/2002 | Holl | |
| 2005/0012652 A1 | 1/2005 | Wakayama | |
| 2006/0099454 A1 | 5/2006 | Morikoshi | |
| 2011/0244003 A1* | 10/2011 | Kumaraswamy | A61L 27/04 |
| | | | 424/400 |
| 2012/0183775 A1 | 7/2012 | Shinba | |
| 2014/0147607 A1* | 5/2014 | Leventis | C08G 18/7657 |
| | | | 428/36.5 |
| 2015/0099168 A1 | 4/2015 | Guo | |
| 2015/0235753 A1 | 8/2015 | Chatani | |
| 2015/0357099 A1* | 12/2015 | Galland | C01G 49/02 |
| | | | 252/62.53 |
| 2016/0044838 A1 | 2/2016 | Aga | |
| 2016/0211061 A1 | 7/2016 | Masuda et al. | |
| 2016/0216626 A1* | 7/2016 | Taguchi | G03G 9/0926 |
| 2016/0276079 A1* | 9/2016 | Nishimoto | H01F 1/37 |

FOREIGN PATENT DOCUMENTS

| | | |
|---|---|---|
| EP | 2 928 039 A1 | 10/2015 |
| EP | 3 065 149 A1 | 9/2016 |
| JP | 11-176680 | 7/1999 |
| JP | 2000-004097 | 1/2000 |
| JP | 2002-289414 | 10/2002 |
| KR | 101627043 | 3/2016 |
| WO | WO 1992-006577 | 4/1992 |

OTHER PUBLICATIONS

Jiang, "Phase Separated Fibrous Structures: Mechanism Study and Applications," Lightweight Materials from Biopolymers and Biofibers, ACS Symposium Series, Oct. 2014, vol. 1175, Chapter 8, pp. 127-141.

Lagashetty, A., et al, Polymer Nanocomposites. *Resonance*, Jul. 31, 2005, vol. 10, No. 7, pp. 49-57.

Bajpai, O.P., et al., A Brief Overview on Ferrite ($Fe_3O_4$) Based Polymeric Nanocomposites: Recent Developments and Challenges. *Journal of Research Updates in Polymer Science.*, Dec. 31, 2014, vol. 3, No. 4, pp. 1-21 Whole document, particular section 2.4.1.

* cited by examiner

THERMOPLASTIC POLYMER COMPOSITE CONTAINING SOFT, FERROMAGNETIC PARTICULATE MATERIAL AND METHODS OF MAKING THEREOF

FIELD

The present invention generally relates to polymer composites that include a thermoplastic polymer, network structure and a soft, ferromagnetic particulate material. The polymer composites may be used, for example, as magnetic flux field directional materials. The present invention also relates to methods of making the polymer composites of the present disclosure.

BACKGROUND

Various composites useful for altering magnetic fields have been disclosed in the art. Such composites are described in, for example, U.S. Pat. Nos. 5,827,445; 5,828, 940 and 9,105,382 B2, and U.S. Pat. Publ. Nos. 2005/0012652 A1 and 2006/0099454 A1. Additionally, various methods for forming porous polymer materials have been disclosed in the art. Such composites are described in, for example, U.S. Pat. Nos. 5,196,262 and 6,524,742 B1.

SUMMARY

In one embodiment, the present disclosure provides a polymer composite including a thermoplastic polymer, network structure and a soft, ferromagnetic particulate material distributed within the thermoplastic polymer, network structure, wherein the weight fraction of soft, ferromagnetic particulate material is between 0.80 and 0.98, based on the total weight of the polymer composite and the thermoplastic polymer has a number average molecular weight between $5 \times 10^4$ g/mol to $5 \times 10^7$ g/mol. In another embodiment, the present disclosure provides a method of making polymer composite sheet having a first major surface including (i) providing a thermoplastic polymer having a number average molecular weight between $5 \times 10^4$ g/mol to $5 \times 10^7$ g/mol, a solvent the thermoplastic polymer is soluble in and, a soft, ferromagnetic particulate material, (ii) mixing the thermoplastic polymer, solvent and soft, ferromagnetic particulate material to form a miscible thermoplastic polymer-solvent solution containing the soft, ferromagnetic particulate material, (iii) forming the thermoplastic polymer-solvent solution containing the soft, ferromagnetic particulate into a sheet, (iv) inducing phase separation of the thermoplastic polymer from the solvent, and (v) removing at least a portion of the solvent, thereby forming a polymer composite sheet having a thermoplastic polymer, network structure and a soft, ferromagnetic particulate material distributed within the thermoplastic polymer, network structure, wherein the weight fraction of soft, ferromagnetic particulate material is from 0.80 and 0.98, based on the total weight of the polymer composite sheet.

Repeated use of reference characters in the specification and drawings is intended to represent the same or analogous features or elements of the disclosure. The drawings may not be drawn to scale. As used herein, the word "between", as applied to numerical ranges, includes the endpoints of the ranges, unless otherwise specified. The recitation of numerical ranges by endpoints includes all numbers within that range (e.g. 1 to 5 includes 1, 1.5, 2, 2.75, 3, 3.80, 4, and 5) and any range within that range.

It should be understood that numerous other modifications and embodiments can be devised by those skilled in the art, which fall within the scope and spirit of the principles of the disclosure. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

Throughout this disclosure, if a substrate or a surface of a substrate is "adjacent" to a second substrate or a surface of a second substrate, the two nearest surfaces of the two substrates are considered to be facing one another. They may be in contact with one another or they may not be in contact with one another, an intervening third substrate or substrate(s) being disposed between them.

DETAILED DESCRIPTION

There is a continual need to include new and improved functionality, for example wireless power charging, within a variety of electronic devices, including, but not limited to, mobile/handheld devices, such as, phones, tablets, video games, laptop computers and the like. As the need for added functionality in these portable electronic devices grows, the space available within these devices for the corresponding components decreases. Additionally, these new and improved functionalities put an increased demand on the capacities of batteries needed to power these devices. As a result, there is a growing need for higher wireless power charging (WPC) capabilities. Wireless power charging is one of the recent additions to the functionalities of mobile/handheld devices. One typical requirement related to WPC is the need to concentrate and/or channel a magnetic field to a specific location within the electronic device, while shielding other areas from the magnetic field. A flux field directional material (FFDM) may be used for this purpose. A FFDM may channel the magnetic flux density through itself and through the receiver coil of the WPC device, thereby preventing the flux from reaching nearby metallic components such as the battery case. As the power demands related to recharging electronic device batteries increases, e.g. the requirement for higher power and an increased rate of power transfer, the FFDM needs to be capable of concentrating and redirecting increasing amounts of magnetic flux. Due to the multitude of electronic device designs, a further need is to have FFDMs that are easily configured to fit in the desired space within the device. In this regard, flexible materials are desirable. However, the most commonly used current FDDM materials, ferrite sheets, tend to be stiff and inflexible. Additionally, amorphous or nano-crystalline ribbons (nano-ribbons) have the capability to redirect high magnetic flux densities, but are more expensive to incorporate in consumer electronic devices. They are also limited to lower frequency applications due to their relatively high electrical conductivity and the resulting induction of lossy eddy currents. Ferrite sheets are limited to relatively low saturation magnetic flux density and are very difficult to shape, convert, or handle in manufacturing without breakage. Therefore, it would be preferable to use traditional composite materials for wireless power transfer. However, due to the processing limitations, the maximum loading level of required magnetic flake in current composite materials is only about 50 volume percent, limiting their utility in high power transfer applications. Also, the current processes employed to produce composite materials result in a higher cost material, as compared to ferrites, for example. Despite the cost disadvantage, composite materials have been employed for some FDDM applications at low power transfer rate (about 5 W). However, these materials have limited capability to confine and redirect the higher flux densities needed for higher power transfer rates (15 W and above) in next generation devices. Additionally, as the WPC protocols involve higher frequencies, in some cases exceeding 1 MHz, FFDMs will have to meet more stringent material requirements (e.g. lower resistivity) that current composite materials do not achieve.

Overall, there is a need for improved FDDM materials that are capable of at least one of: improved forming characteristics, e.g. improved flexibility, increased power transfer levels and lower cost. The present disclosure provides a unique polymer composite capable of functioning, for example, as an FDDM having improved performance. The polymer composites of the present disclosure include a thermoplastic polymer, network structure and a soft, ferromagnetic particulate material distributed within the thermoplastic polymer, network structure. The unique method of making the polymer composite, which includes an induced phase separation of a thermoplastic polymer-solvent mixture containing the soft, ferromagnetic particulate material, allows for very high loading of the soft, ferromagnetic particulate material (up to about 80 percent by volume) and low polymer content (down to about 4 percent by weight) within the polymer composite, due to the thermoplastic polymer, network structure formed during the fabrication process. As a consequence, a high saturation magnetic flux density, e.g. 0.67 T, can be achieved using approximately 100 micrometer thick films of the polymer composite, which will enable these polymer composites to improve the high power, wireless charging capabilities of electronic devices. The unique structure of the composite, which includes a thermoplastic polymer, network structure, also enables improved flexibility and forming characteristics of the polymer composite of the present disclosure.

In one embodiment, the present disclosure provides a polymer composite including a thermoplastic polymer, network structure and a soft, ferromagnetic particulate material distributed within the thermoplastic polymer, network structure, wherein the weight fraction of soft, ferromagnetic particulate material is between 0.80 and 0.98, based on the total weight of the polymer composite, and the thermoplastic has a number average molecular weight between $5 \times 10^4$ g/mol to $5 \times 10^7$ g/mol. The thermoplastic polymer, network structure may be considered a 3-dimensional reticular structure. The thermoplastic polymer, network structure is, inherently, porous and may have a continuous, porous network structure. In some embodiments, at least a portion of the thermoplastic polymer, network structure is a continuous thermoplastic polymer, network structure. In some embodiments, at least 10 percent, at least 30 percent, at least 50 percent, at least 70 percent, at least 90 percent, at least 95 percent or even the entire thermoplastic polymer, network structure, by volume, is a continuous thermoplastic polymer, network structure. It should be noted that the portion of the volume of the polymer composite associated with the soft, ferromagnetic particulate material distributed within the thermoplastic polymer, network structure is not considered part of the thermoplastic polymer, network structure. In some embodiments, the soft, ferromagnetic particulate material is uniformly distributed within the thermoplastic polymer, network structure. In some embodiments, when the soft, ferromagnetic particulate material is an anisotropic, soft, ferromagnetic particulate material, the anisotropic, soft, ferromagnetic particulate material may be randomly distributed within the thermoplastic polymer, network structure. By "random", it is meant without orientation of the particulate material with respect to its anisotropy. In some embodiments, when the soft, ferromagnetic particulate material is an anisotropic, soft, ferromagnetic particulate material, the anisotropic, soft, ferromagnetic particulate material may be uniformly and randomly distributed within the thermoplastic polymer, network structure. In some embodiments, when the soft, ferromagnetic particulate material is an anisotropic, soft, ferromagnetic particulate material, the anisotropic, soft, ferromagnetic particulate material may be distributed such that the anisotropic, soft, ferromagnetic particulate material is oriented within the thermoplastic polymer, network structure. In some embodiments, when the soft, ferromagnetic particulate material is an anisotropic, soft, ferromagnetic particulate material, the anisotropic, soft, ferromagnetic particulate material may be uniformly distributed such that the anisotropic, soft, ferromagnetic particulate material is oriented within the thermoplastic polymer, network structure.

Figure 1:
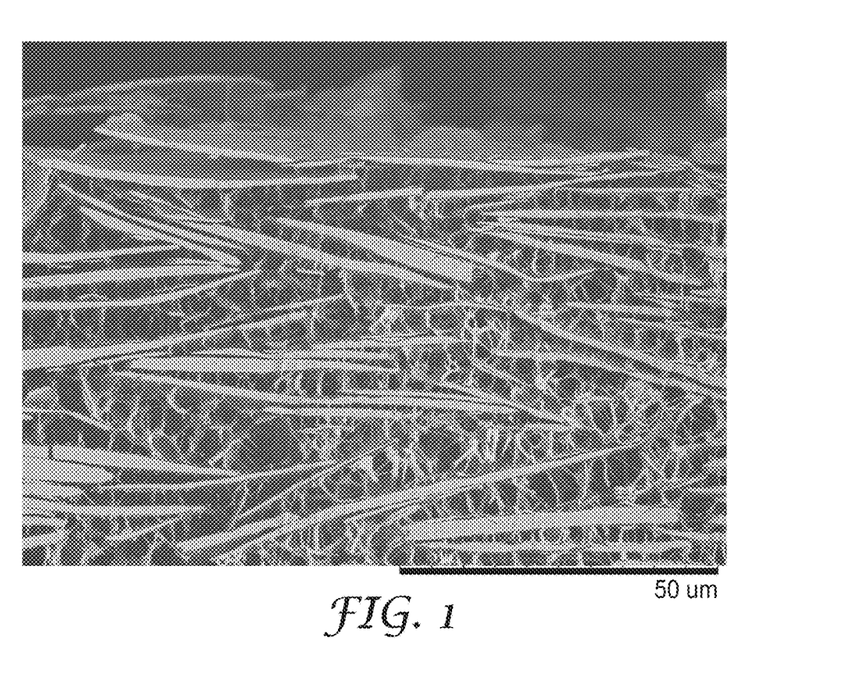
FIG. 1 shows a cross-sectional SEM image of an exemplary polymer composite, according to one exemplary embodiment of the present disclosure.

FIG. 1 shows an SEM micrograph of a cross-section of an exemplary polymer composite of the present disclosure. The polymer composite of FIG. 1 includes soft, ferromagnetic particulate material in the form of flake having a length dimension in the range of about 30 micrometers to about 100 micrometers and a thickness, generally, from about 1 micrometers to about 5 micrometers. The length dimension of the flake, generally, is parallel to the top surface of the polymer composite. As the image is of a cross-section, the flake appears as needle-like objects running, generally, parallel to one another. The thermoplastic polymer, network structure is observed between the flakes and includes a plurality of interconnected thermoplastic fibrils. In this exemplary embodiment, the thermoplastic fibrils, generally, have a length from about 5 micrometers to about 15 micrometers and have a thickness, i.e. width, generally, from about 1 micrometer to about 3 micrometers. Based on the process used to fabricate the polymer composite of FIG. 1, which involves induced phase separation of a thermoplastic polymer-solvent mixture containing the soft, ferromagnetic particulate material, followed by extraction of the solvent, the thermoplastic polymer, network structure shown in FIG. 1 is a continuous thermoplastic polymer, network structure.

In some embodiments, the thermoplastic polymer, network structure includes a plurality of interconnected thermoplastic fibrils. The interconnected thermoplastic fibrils may adhere directly to the surface of the soft, ferromagnetic particulate material and act as a binder for the soft, ferromagnetic particulate material, i.e. in some embodiments the thermoplastic polymer, network structure is a binder for the soft, ferromagnetic particulate material. Although not wishing to be bound by theory, it is thought that the formation of the thermoplastic polymer, network structure gives the polymer composites of the present disclosure improved flexibility compared to a conventional composite material, i.e. composite without the thermoplastic polymer network structure, while enabling higher mass/volume loading of soft, ferromagnetic particulate material. Surprisingly, this unique construction enables better handling characteristics in end use applications, likely due to the more flexible nature of the thermoplastic polymer, network structure, while having improved performance as a magnetic FFDM, likely due to the ability to obtain higher loading of the soft, ferromagnetic particulate material within the polymer composite.

In order to increase the magnetic FFDM characteristics of the polymer composites of the present disclosure, it is desirable to increase the amount of the soft, ferromagnetic particulate material in the polymer composite. In some embodiments, the weight fraction of soft, ferromagnetic particulate material may be between 0.80 and 0.98, between 0.85 and 0.97 or even between 0.90 and 0.96, based on the total weight of the polymer composite. In some embodiments, the volume fraction of soft, ferromagnetic particulate material may be between 0.10 and 0.80, between 0.20 and 0.80, between 0.30 and 0.80, between 0.10 and 0.75, between 0.20 and 0.75, between 0.30 and 0.75, between 0.10 and 0.70, between 0.20 and 0.70 or even between 0.30 and 0.70, based on the total volume of the polymer composite. Additionally, in order to increase the magnetic FFDM characteristics of the polymer composites of the present disclosure, it is desirable to have a polymer composite having a high density. Increasing the density of the polymer composite can be achieved in a variety of ways, including, but not limited to, using a higher density soft, ferromagnetic particulate material; using a higher weight fraction of the soft, ferromagnetic particulate material in the polymer composite; and/or densifying a portion of the thermoplastic polymer network structure of the polymer composite. The unique structure of the polymer composites of the present disclosure offers an alternative means of densifying the polymer composite not available to traditional composites, as the thermoplastic polymer network structure of the polymer composites of the present disclosure may be collapsed by the application of at least one of a compressive or tensile force, thereby densifying the polymer composite. Although high densities can be achieved, the densification process may be conducted at a temperature that produces plastic deformation of the thermoplastic polymer of the thermoplastic polymer, network structure, which allows a small portion of the thermoplastic polymer, network structure to remain. This process yields a high density material with enhanced FFDM characteristics (compared to the non-collapsed polymer composite), while still maintaining the improved handling characteristics associated with the flexibility of the thermoplastic polymer, network structure. Generally, it is not desirable to collapse the thermoplastic polymer, network structure at a temperature that will melt the thermoplastic polymer network structure, as this may result in a loss of the thermoplastic polymer network structure. In some embodiments, the polymer composite is not exposed to a temperature above the glass transition temperature of the thermoplastic polymer. In some embodiments, the polymer composite is not exposed to a temperature above the melting temperature of the thermoplastic polymer. In some embodiments, when two or more thermoplastic polymer types are used for the thermoplastic polymer, the polymer composite is not exposed to a temperature above the highest glass transition temperature of the thermoplastic polymer. In some embodiments, when two or more thermoplastic polymer types are used for the thermoplastic polymer, the polymer composite is not exposed to a temperature above the highest melting temperature of the thermoplastic polymer.

Figure 2:
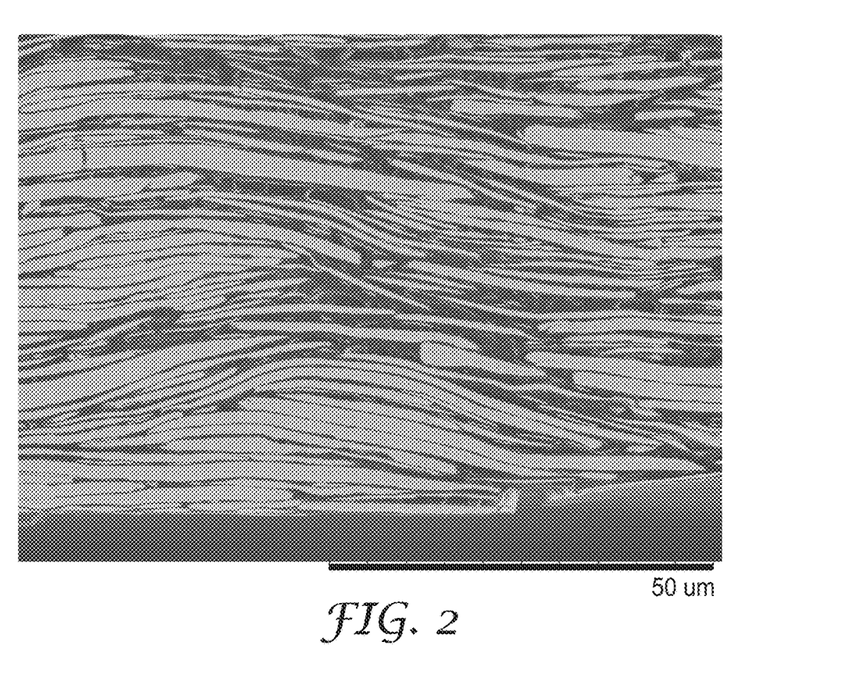
FIG. 2 shows a cross-sectional SEM image of the exemplary polymer composite of FIG. 1, after the polymer composite has been densified, according to one exemplary embodiment of the present disclosure.

FIG. 2 shows a cross-sectional SEM image of an exemplary polymer composite of FIG. 1, after the thermoplastic polymer network structure has been collapsed. Compared to FIG. 1, the polymer composite has been densified, with the soft, ferromagnetic magnetic particulate (soft, ferromagnetic particulate flake material, in this embodiment), being compressed together. The spacing between the flakes has been significantly reduced. Compared to FIG. 1, the thermoplastic polymer, network structure of FIG. 2 was significantly reduced, due to the collapse of the thermoplastic polymer, network structure by the application of a compressive force. The application of the compressive force was conducted at a temperature to cause plastic deformation of the thermoplastic polymer network structure. Although a high density polymer composite has been formed, small regions of the thermoplastic polymer, network structure are still discernable in FIG. 2.

In some embodiments, thermoplastic polymer, network structure may be plastically deformed. In some embodiments, thermoplastic polymer, network structure may be plastically deformed by at least one of a compressive force and a tensile force. In some embodiments, thermoplastic polymer, network structure may be plastically deformed by only a compressive force. In some embodiments, thermoplastic polymer, network structure may be plastically deformed by only a tensile force. The flexibility of the polymer composite can be determined through a variety of techniques, such as, a flexural modulus test or by examining the ability of a sheet of the polymer composite to bend around a cylindrical object having a defined radius, i.e. a defined radius of curvature. In some embodiments, the polymer composite is capable of bending to form a radius of curvature of 10 mm, 5 mm or even 3 mm, when the polymer composite is in the form of a sheet having a thickness between 20 micrometers to 300 micrometers. In some embodiments, the polymer composite is capable of bending to form a radius of curvature of 10 mm, 5 mm or even 3 mm, when the polymer composite is in the form of a sheet having a thickness of 150 micrometers.

When the polymer composite is in the form of a sheet having a first major surface and when the soft, ferromagnetic particulate has at least one aspect ratio, based on length dimension/thickness dimension, that is greater than one (an anisotropic particulate with respect to shape, e.g. flake), the deformation, e.g. plastic deformation, of the thermoplastic polymer, network structure may orient the length dimension of the soft, ferromagnetic magnetic particulate relative to the first major surface of the polymer composite. Aligning or orienting the length dimension of an anisotropic soft, ferromagnetic magnetic particulate relative to the first major surface of the polymer composite sheet may improve the FFDM characteristics of the polymer composite. In some embodiments, the polymer composite is in the form of a sheet having a first major surface and the soft, ferromagnetic particulate material is a soft, ferromagnetic particulate flake material, each flake having a first major surface and a thickness normal to the first major surface of the flake, wherein a majority of the first major surfaces of the flakes are oriented to be within at least 25 degrees of the adjacent first major surface of the polymer composite sheet. By "majority" it is meant that at least 50 percent of the flakes of the first major surfaces of the flakes are oriented to be within at least 25 degrees of the adjacent first major surface of the polymer composite sheet. In some embodiments, at least 30 percent, at least 50 percent, at least 70 percent, at least 80 percent, at least 90 percent, at least 95 percent, at least 98 percent or even 100 percent of the first major surfaces of the flakes are oriented to be within at least 25 degrees, at least 20 degrees, at least 15 degrees or even at least even 10 degrees of the adjacent first major surface of the polymer composite sheet. In some embodiments, the polymer composite is in the form of a sheet having a first major surface and a thickness of between 20 micrometers and 5000 micrometers and, the soft, ferromagnetic particulate material is a soft, ferromagnetic particulate flake material, each flake having a first major surface and a thickness normal to the first major surface of the flake, wherein a majority of the first major surfaces of the flakes are oriented to be within at least 25 degrees of the adjacent first major surface of the polymer composite sheet.

The density of the polymer composite may vary, depending on the density and amount of soft, ferromagnetic particulate material used, the density of the thermoplastic polymer and the porosity of the thermoplastic polymer network structure. Generally, the higher the density, the greater the magnetic properties, e.g. FFDM characteristics, of the polymer composite. In some embodiments, the density of the polymer composite is between 1.5 g/cm$^3$ and 6 g/cm$^3$, between 1.5 g/cm$^3$ and 5.5 g/cm$^3$, between 1.5 g/cm$^3$ between 3.0 g/cm$^3$, between 1.5 g/cm$^3$ and 2.5 g/cm$^3$, between 3.0 g/cm$^3$ and 6.0 g/cm$^3$, between 3.0 g/cm$^3$ and 5.5 g/cm$^3$, between 3.0 g/cm$^3$ and 5.0 g/cm$^3$, between 3.5 g/cm$^3$ and 6.0 g/cm$^3$, between 3.5 g/cm$^3$ and 5.5 g/cm$^3$ or even between 3.5 g/cm$^3$ and 5.0 g/cm$^3$.

The thickness of the polymer composite, e.g. the thickness of a polymer composite sheet, is not particularly limited. However, for many applications, e.g. mobile/handheld electronic devices, it is desirable for this thickness of the polymer composite, e.g. the thickness of a polymer composite sheet, to be below 5000 micrometers, below 3000 micrometers or even below 1000 micrometers and above 20 micrometers, 40 micrometers or even above 60 micrometers. In some embodiments, the thickness of the polymer composite, e.g. the thickness of a polymer composite sheet, is between 20 micrometers and 5000 micrometers, between 20 micrometers and 3000 micrometers, between 20 micrometers and 1000 micrometers, between 20 micrometers and 500 micrometers, between 20 micrometers and 300 micrometers, between 40 micrometers and 5000 micrometers, between 40 micrometers and 3000 micrometers, between 40 micrometers and 1000 micrometers, between 40 micrometers and 500 micrometers, between 40 micrometers and 300 micrometers, between 60 micrometers and 5000 micrometers, between 60 micrometers and 3000 micrometers, between 60 micrometers and 1000 micrometers, between 60 micrometers and 500 micrometers or even between 60 micrometers and 300 micrometers.

Aspects of the polymer composite that affects the magnetic properties of the polymer composite, include, but are not limited to, the type of and amount of soft, ferromagnetic particulate material used in the polymer composite, the particulate shape, e.g. flake, and the orientation of the particulate, if it is anisotropic in shape. Orientation of the first major surfaces of the flakes of the soft, ferromagnetic particulate flake material, relative to the first major surface of the polymer composite sheet, may lead to enhanced magnetic properties of the polymer composite sheet. By "orientation" it is meant that the first major surface of a flake is aligned with the first major surface of the composite sheet. Perfect alignment, i.e. perfect orientation, would be if the first major surface of the flake was parallel to the first major surface of the polymer composite sheet, i.e. the angle between the first major surface of a flake and the first major surface of the polymer composite would be zero degrees. In some embodiments, the polymer composite has a magnetic saturation induction between 600 mT to 1000 mT, between 600 mT and 900 mT, between 700 and 100 mT or even between 700 and 900 mT. In electromagnetism, the ability of a material to support the formation of a magnetic field within itself is called the permeability, $\mu$, and represents the degree to which a material can be magnetized in response to an applied magnetic field. The relative permeability is the ratio of the permeability of a material, $\mu$, to the permeability of free space, i.e. vacuum, $\mu_o$. The permeability of free space, $\mu_o$, may be defined as $1.257 \times 10^{-6}$ H/m. In some embodiments, the magnitude of the relative permeability, $\mu/\mu_o$, of the polymer composites of the present disclosure at a frequency of 1 MHz may be greater than 70, greater than 150 or even greater than 500. In some embodiments, the magnitude of the relative permeability at a frequency between 50 MHz to 1000 MHz is greater than 70, greater than 150 or even greater than 500. In some embodiments, the magnitude of the relative permeability at a frequency between 50 MHz to 300 MHz is greater than 70, greater than 150 or even greater than 500.

The polymer composite includes a thermoplastic polymer, which will be formed into a thermoplastic polymer, network structure. The thermoplastic polymer is not particularly limited. In some embodiments, the thermoplastic polymer includes, but is not limited to, at least one of polyurethane, polyester (e.g. polyethylene terephthalate, polybutylene terephthalate and polylactic acid), polyamide (e.g. nylon 6, nylon 6,6 and polypeptides), polyether (polyethylene oxide and polypropylene oxide), polycarbonate (bisphenol-A-polycarbonate), polyimide, polysulphone, polyphenylene oxide, polyacrylate (e.g. thermoplastic polymers formed from the addition polymerization of monomer containing an acrylate functional group), polymethacrylate (e.g. thermoplastic polymers formed from the addition polymerization of monomer containing a methacrylate functional group), polyolefin (polyethylene and polypropylene), styrene and styrene based random and block copolymer, chlorinated polymer (polyvinyl chloride), fluorinated polymer (polyvinylidene fluoride; copolymers of tetrafluoroethylene, hexafluoropropylene and vinylidene fluoride; copolymers of ethylene, tetrafluoroethylene; and hexafluoropropylene; and polytetrafluroethylene), and copolymers of ethylene and chlorotrifluoroethylene. Thermoplastic polymer may be at least one of a homopolymer and a copolymer, e.g. a block copolymer or a random copolymer. In some embodiments, the thermoplastic polymer is a mixture of two or more thermoplastic polymer types, e.g. a mixture of polyethylene and polypropylene or a mixture of polyethylene and polyacrylate. In some embodiments, the polymer may be at least one of polyethylene (e.g. ultra-high molecular weight polyethylene), polypropylene (e.g. ultra-high molecular weight polypropylene), polylactic acid, poly(ethylene-co-chlorotrifluoroethylene) and polyvinylidene fluoride. In some embodiments, the thermoplastic polymer is a single thermoplastic polymer, i.e. it is not a mixture of two or more thermoplastic polymer types.

The molecular weight of the thermoplastic polymer is not particularly limited, except that it must have a molecular weight high enough to allow for phase separation from a solvent, resulting in the formation of the network structure. Generally, this may require that the number average molecular weight of the thermoplastic polymer be greater than $5 \times 10^4$ g/mol. In some embodiments, the number average molecular weight of the thermoplastic polymer may be between $5 \times 10^4$ g/mol to $5 \times 10^7$ g/mol, between $5 \times 10^4$ g/mol to $1 \times 10^7$ g/mol, between, between $5 \times 10^4$ g/mol to $5 \times 10^6$ g/mol, between $1 \times 10^5$ g/mol to $1 \times 10^7$ g/mol, between $1 \times 10^5$ g/mol to $5 \times 10^6$ g/mol, between $1 \times 10^6$ g/mol to $1 \times 10^7$ g/mol, between $3 \times 10^6$ g/mol to $1 \times 10^7$ g/mol, between $5 \times 10^6$ g/mol to $1 \times 10^7$ g/mol, between $1 \times 10^6$ g/mol to $5 \times 10^7$ g/mol, between $3 \times 10^6$ g/mol to $5 \times 10^7$ g/mol, between $5 \times 10^6$ g/mol to $5 \times 10^7$ g/mol or even between $1 \times 10^6$ g/mol to $5 \times 10^6$ g/mol. Thermoplastic polymers having ultra-high molecular weights may be particularly useful. In some embodiments, ultra-high molecular weight is defined as a thermoplastic polymer having a number average molecular weight of at least $3 \times 10^6$ g/mol. The number average molecular weight may be measured by know techniques in the art, including, but not limited to, gel permeation chromatography (GPC). GPC may be conducted in a good solvent for the thermoplastic polymer, along with the use of narrow molecular weight distribution polymer standards, e.g. narrow molecular weight distribution polystyrene standards. Thermoplastic polymers are generally characterized as being partially crystalline, exhibiting a melting point. In some embodiments, the thermoplastic polymer has a melting point between 120° C. to 350° C., between 120° C. to 300° C., between 120° C. to 250° C. or even between 120° C. to 200° C. The melting point of the thermoplastic polymer may be measured by known techniques in the art, including but not limited to, the on-set temperature measured in a differential scanning calorimetry (DSC) test, conducted with a 5 mg to 10 mg sample, at a heating scan rate of 10° C./min, while the sample is under a nitrogen atmosphere.

The thermoplastic polymer of the polymer composite is formed into a thermoplastic polymer, network structure through a process which includes mixing the thermoplastic polymer and an appropriate solvent to form a miscible thermoplastic polymer-solvent solution, followed by phase separation of the thermoplastic polymer from the solvent, and then removing at least a portion of the solvent. This process is typically conducted with the addition of the soft, ferromagnetic particulate material to the miscible polymer-solvent solution, prior to phase separation. The thermoplastic polymer, network structure may be formed during the phase separation step of the process. In some embodiments, the thermoplastic polymer, network structure is produced by an induced phase separation of a miscible thermoplastic polymer-solvent solution. The thermoplastic polymer, network structure inherently includes porosity, i.e. pores. The porosity may be continuous, enabling fluid communication from an interior region of the thermoplastic polymer, network structure to a surface of the thermoplastic polymer, network structure and/or between a first surface of the thermoplastic polymer, network structure and an opposing second surface of the thermoplastic polymer, network structure.

The pore size of the thermoplastic polymer, network structure is not particularly limited. In some embodiments, the pore size is on the micrometer scale, i.e. between about 1 micrometer and 1000 micrometers. In some embodiments, the pore size is on the nanometer scale, i.e. between about 10 nanometers and 1000 nanometers. In some embodiments the average or median pore size, P, of the thermoplastic polymer, network structure is between 10 nanometers to 1000 micrometers, between 10 nanometers to 500 micrometers, between 10 nanometers to 250 micrometers, between 10 nanometers to 100 micrometers, between 10 nanometers to 50 micrometers, between 10 nanometers to 25 micrometers, between 100 nanometers to 1000 micrometers, between 50 nanometers to 1000 micrometers, between 50 nanometers to 500 micrometers, between 50 nanometers to 250 micrometers, between 50 nanometers to 100 micrometers, between 50 nanometers to 50 micrometers, between 50 nanometers to 25 micrometers, between 100 nanometers to 1000 micrometers, between 100 nanometers to 500 micrometers, between 100 nanometers to 250 micrometers, between 100 nanometers to 100 micrometers, between 100 nanometers to 50 micrometers, between 100 nanometers to 25 micrometers, between 250 nanometers to 1000 micrometers, between 250 nanometers to 500 micrometers, between 250 nanometers to 250 micrometers, between 250 nanometers to 100 micrometers, between 250 nanometers to 50 micrometers or even between 250 nanometers to 25 micrometers. Conventional pore size analysis techniques, including imaging of cross-sections (optical microscopy, scanning electron microscopy or atomic force microscopy, for example) and analysis of the image using appropriate software, for example ImageJ software (an open source software, available on-line at http://imagej.net, for example) may be used to statistically analyze the pore size and pore size distribution. X-ray microtomography and mercury porsimetry, bubble point and capillary flow porometry may also be used to analyze the pore size and/or pore size distribution. The continuous nature of the porosity of the thermoplastic polymer, network structure may facilitate removal of the solvent from the thermoplastic polymer, network structure. In the present disclosure, the term "thermoplastic polymer, network structure" inherently means that at least a portion of the porosity of the thermoplastic polymer, network structure is free of liquid and solid, e.g. contains one or more gases, such as air. In some embodiments, between 10 percent to 100 percent, between 30 percent to 100 percent, between 50 percent to 100 percent, between 60 percent to 100 percent, between 70 percent to 100 percent, between 80 percent to 100 percent, between 90 percent to 100 percent, between 95 percent to 100 percent, or even between 98 percent to 100 percent by volume, of the porosity of the thermoplastic polymer, network structure is free of liquid and solid, e.g. contains one or more gases, such as air.

In order to form a miscible thermoplastic polymer-solvent solution, the solvent is required to dissolve the thermoplastic polymer. Thus, the solvent for a specific thermoplastic polymer is selected based on this requirement. The thermoplastic polymer-solvent mixture may be heated to facilitate the dissolution of the thermoplastic polymer in the solvent. After the thermoplastic polymer has phase separated from the solvent, at least a portion of the solvent is removed from the thermoplastic polymer, network structure using techniques known in the art, including evaporation of the solvent or extraction of the solvent by a lower vapor pressure, second solvent, followed by evaporation of the second solvent. In some embodiments, at least 10 percent to 100 percent, at least 30 percent to 100 percent, at least 50 percent to 100 percent, at least 60 percent to 100 percent, at least 70 percent to 100 percent, at least 80 percent to 100 percent, at least 90 percent to 100 percent, at least 95 percent to 100 percent or even at least 98 percent to 100 percent by weight of the solvent, and second solvent, if used, is removed from the thermoplastic polymer, network structure.

The polymer composites of the present disclosure includes soft, ferromagnetic particulate material. The term "soft" in describing the ferromagnetic particulate material has its traditional meaning in the art, and relates to the ability of a non-magnetic material to become magnetic, when placed within a magnetic field, e.g. a weak magnetic field. The induced magnetism of the soft, ferromagnetic particulate material, will substantially vanish when the magnetic field is removed, i.e. the material exhibits reversible magnetism in an applied magnetic field. In some embodiments, the coercivity of the soft magnetic particulate material is between 1 A/m to 1000 A/m, between 10 A/m to 1000 A/m or even between 30 A/m to 1000 A/m. In some embodiments, the coercivity of the soft magnetic particulate material is less than or equal to 1000 A/m. Soft ferromagnetic materials may have narrow hysteresis loops, i.e. low values of coercive field, Hc, high magnetic saturation inductions, high permeability and, for high frequency application, desirably have low electrical conductivity to minimize eddy current power losses. In some embodiments, the soft, ferromagnetic particulate material may include at least one of iron, including, but not limited to, Fe—Cr alloys, Fe—Si alloys (including, but not limited to, Fe—Si—Al, which is commercially available under the trade designation SENDUST from Tainjin Ecotech Trade Co., Ltd., Tainjin, China, and Fe—Si—Cr,), FeCoB, Fe based amorphous alloys, nanocrystalline Fe-based oxides, and nanocrystalline Fe-based nitrides; nickel based alloys, including, but not limited to, Ni—Fe alloys and Ni—Si alloys; CoNbZr; and boron based amorphous alloy.

The shape of the soft, ferromagnetic particulate material is not particularly limited, however, flake shaped particulate may be particularly beneficial. A flake may be considered an irregularly shaped, plate-like structure, having a first and second major surface and a thickness, substantially normal to at least one of the first and second major surfaces. In some embodiments, the soft, ferromagnetic particulate material is a soft, ferromagnetic particulate flake material, each flake having a first major surface and a maximum thickness, T, normal to the first major surface of the flake. The flakes of the soft, ferromagnetic particulate flake material may be characterized by a median diameter, D50 (which relates to a length dimension, L) and a maximum thickness, T. In some embodiments, the soft, ferromagnetic particulate material may be an anisotropic, soft, ferromagnetic particulate material. The aspect ratio of an anisotropic soft, ferromagnetic particulate may be defined as the median diameter, D50, as determined by particle size analysis for example, divided by the maximum thickness of the anisotropic particulate, as determined from image analysis for example. For a particular set of soft, ferromagnetic particulate material, the value of the maximum thickness may be taken as the median value, Tm. The ratio D50/Tm is the median aspect ratio. In some embodiments, the median aspect ratio, D50/Tm, is between 5/1 to 1000/1, between 10/1 to 1000/1, between 20/1 to 1000/1, between 5/1 to 500/1, between 10/1 and to 500/1, between 20/1 to 500/1, between 5/1 to 200/1, between 10/1 to 200/1 or even between 20/1 to 200/1.

In some embodiments, the image length of a flake, Li, as observed and measured in a cross-sectional image of the polymer composite, may be taken as the length of the flake, and the image thickness of a flake, Ti, may be taken as the largest thickness of a flake, as observed and measured in a cross-sectional image of the polymer composite. The image may be an optical micrograph or SEM, for example. For a particular set of soft, ferromagnetic particulate flake material, the values of Li and Ti may be taken as average values, Lia (average image length) and Tia (average image thickness), of a subset of flakes using standard statistical analysis methods. In some embodiments, Lia/Tia is between 5/1 and 1000/1, between 10/1 and 1000/1, between 20/1 and 1000/1, between 5/1 and 500/1, between 10/1 and 500/1, between 20/1 and 500/1, between 5/1 and 200/1, between 10/1 and 200/1 or even between 20/1 and 200/1.

In some embodiments, D50 is between 5 micrometers to 5000 micrometers, between 5 micrometers to 1000 micrometers, between 5 micrometers to 500 micrometers, between 5 micrometers to 200 micrometers, between 10 micrometers to 5000 micrometers, between 10 micrometers to 1000 micrometers, between 10 micrometers to 500 micrometers, between 10 micrometers to 200 micrometers, between 25 micrometers to 5000 micrometers, between 25 micrometers to 1000 micrometers, between 25 micrometers to 500 micrometers or even between 25 micrometers to 200 micrometers.

In some embodiments, the flakes of the soft, ferromagnetic particulate flake material have a median diameter, D50, and the thermoplastic polymer, network structure has an average pore size, P, and D50>2P. In some embodiments, D50 is between 25 micrometers to 5000 micrometers, P is between 50 nanometers to 25 micrometers and D50>2P. In some embodiments, D50 is between 10 micrometers to 5000 micrometers, P is between 50 nanometers to 25 micrometers and D50>2P. In some embodiments, D50 is between 25 micrometers to 5000 micrometers, P is between 50 nanometers to 25 micrometers and D50>4P. In some embodiments, D50 is between 10 micrometers to 5000 micrometers, P is between 50 nanometers to 25 micrometers and D50>4P. In some embodiments, D50 is between 25 micrometers to 5000 micrometers, P is between 50 nanometers to 25 micrometers and D50>6P. In some embodiments, D50 is between 10 micrometers to 5000 micrometers, P is between 50 nanometers to 25 micrometers and D50>6P.

The present disclosure also provides a method of making polymer composite sheet having a first major surface including (i) providing a thermoplastic polymer having a number average molecular weight between $5 \times 10^4$ g/mol to $5 \times 10^7$ g/mol, a solvent the thermoplastic polymer is soluble in and, a soft, ferromagnetic particulate material, (ii) mixing the thermoplastic polymer, solvent and soft, ferromagnetic particulate material to form a miscible thermoplastic polymer-solvent solution containing the soft, ferromagnetic particulate material, (iii) forming the thermoplastic polymer-solvent solution containing the soft, ferromagnetic particulate into a sheet, (iv) inducing phase separation of the thermoplastic polymer from the solvent and (v) removing at least a portion of the solvent, thereby forming a polymer composite sheet having a thermoplastic polymer, network structure and a soft, ferromagnetic particulate material distributed within the thermoplastic polymer, network structure, wherein the weight fraction of soft, ferromagnetic particulate material is from 0.80 and 0.98, based on the total weight of the polymer composite sheet.

The solvent is selected such that it is capable of dissolving the thermoplastic polymer and forming a miscible thermoplastic polymer-solvent solution. Heating the solution to an elevated temperature may facilitate the dissolution of the thermoplastic polymer. In some embodiments, the mixing step is conducted at a temperature between 20° C. to 300° C., between 20° C. to 250° C., between 20° C. to 200° C., between 20° C. to 150° C., between 40° C. to 300° C., between 40° C. to 250° C., between 40° C. to 200° C., between 40° C. to 150° C., between 60° C. to 200° C. or even between 60° C. to 150° C. The soft, ferromagnetic particulate material may be added at the beginning of the mixing step, before the thermoplastic polymer is dissolved, after the thermoplastic polymer is dissolved or at any time there between. It may be advantageous to add the soft, ferromagnetic particulate material after the polymer is fully dissolved and the miscible thermoplastic polymer-solvent solution has been formed, in order to minimize the amount of shear forces the soft, ferromagnetic particulate material is exposed to, as the shear force could cause a change in the soft, ferromagnetic particulate material size distribution.

The solvent, e.g. a first solvent, is not particularly limited, except in that it must be selected such that it forms a miscible thermoplastic polymer-solvent solution. The solvent may be a blend of two or more individual solvents. In some embodiments, when the thermoplastic polymer is a polyolefin, e.g. at least one of polyethylene and polypropylene, the solvent may be selected at least one of mineral oil, tetralin, decalin, 1,2-orthodichlorobenzene, cyclohexane-toluene mixture, dodecane, paraffin oil, kerosene, p-xylene/cyclohexane mixture (1/1 wt/wt), champhene, 1,2,4 trichlorobenzene, octane, orange oil, vegetable oil, castor oil and palm kernel oil. In some embodiments, when the thermoplastic polymer is polyvinylidene fluoride, the solvent may be at least one of ethylene carbonate, propylene carbonate and 1,2,3 triacetoxypropane. The solvent may be removed by evaporation, high vapor pressure solvents being particularly suited to this method of removal. However, if the first solvent has a low vapor pressure, a second solvent, of high vapor pressure, may be used to extract the first solvent, followed by evaporation of the second solvent. For example, in some embodiments, when mineral oil is used as a first solvent, isopropanol at elevated temperature, e.g. about 60° C., or a blend of methyl nonafluorobutyl ether ($C_4F_9OCH_3$), ethylnonafluorobutyl ether ($C_4F_9OC_2H_5$), and trans-1,2-dichloroethylene (available under the trade designation NOVEC 72DE from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature, e.g. about 60° C., may be used as the second solvent. In some embodiments, when ethylene carbonate is used as the first solvent, water may be used as the second solvent.

After mixing the thermoplastic polymer, solvent and soft, ferromagnetic particulate material to form a miscible thermoplastic polymer-solvent solution containing the soft, ferromagnetic particulate material, the miscible thermoplastic polymer-solvent solution containing the soft, ferromagnetic particulate material is formed into a sheet. The forming of the thermoplastic polymer-solvent solution containing the soft, ferromagnetic particulate into a sheet is generally conducted prior to the inducing phase separation step. The forming into a sheet step may be conducted by techniques known in the art, including, but not limited to, knife coating, roll coating, e.g. roll coating through a defined nip, and extrusion, e.g. extrusion through a die e.g. extrusion through a die having the appropriate sheet dimensions, i.e. width and thickness of the die gap. In one embodiment, the miscible thermoplastic polymer-solvent solution containing the soft, ferromagnetic particulate material has a paste like consistency and is formed into a sheet by extrusion, e.g. extrusion through a die having the appropriate sheet dimensions, i.e. width and thickness of the die gap.

After forming the thermoplastic polymer-solvent solution containing the soft, ferromagnetic particulate into a sheet, the thermoplastic polymer is then allowed to phase separate. Phase separation is conducted by inducing phase separation of the thermoplastic polymer. Several techniques may be used to induce phase separation, including, but not limited to, at least one of thermally induced phase separation and solvent induced phase separation. In some embodiment, the inducing phase separation step includes at least one of thermally induced phase separation and solvent induced phase separation. Thermally induced phase separation may occur when the temperature at which induced phase separation is conducted is lower than the mixing temperature of the mixing step of the thermoplastic polymer, solvent and soft, ferromagnetic particulate material. This may be achieved by cooling the miscible polymer-solvent solution containing the soft, ferromagnetic particulate material, if the mixing step is conducted near room temperature, or by first heating the miscible polymer-solvent solution containing the soft, ferromagnetic particulate material to an elevated temperature (either during mixing or after mixing), followed by decreasing the temperature of the miscible polymer-solvent solution containing the soft, ferromagnetic particulate material, thereby inducing phase separation of the thermoplastic polymer. In both cases the cooling step will cause phase separation of the thermoplastic polymer from the solvent. Solvent induced phase separation can be conducted by adding a second solvent, a poor solvent for the thermoplastic polymer, to the miscible polymer-solvent solution containing the soft, ferromagnetic particulate material or may be achieved by removing at least a portion of the solvent of the miscible polymer-solvent solution containing the soft, ferromagnetic particulate material, e.g. evaporating at least a portion of the solvent of the miscible polymer-solvent solution containing the soft, ferromagnetic particulate material, thereby inducing phase separation of the thermoplastic polymer. Combination of phase separation techniques, e.g. thermally induced phase separation and solvent induced phase separation, may be employed. Thermally induced phase separation, may be advantageous, as it also facilitates the dissolution of the thermoplastic polymer, when the mixing step is conducted at an elevated temperature. In some embodiments, the inducing phase separation step is conducted at a temperature that is between 5° C. to 300° C. below the mixing step temperature, between 5° C. to 250° C. below the mixing step temperature, between 5° C. to 200° C. below the mixing step temperature, between 5° C. to 150° C. below the mixing step temperature, between 15° C. to 300° C. below the mixing step temperature, between 15° C. to 250° C. below the mixing step temperature, between 15° C. to 200° C. below the mixing step temperature, between 15° C. to 130° C. below the mixing step temperature or even between 25° C. to 110° C. below the mixing step temperature.

After inducing phase separation, at least a portion of the solvent is removed from the polymer composite, thereby forming a polymer composite sheet having a thermoplastic polymer, network structure and a soft, ferromagnetic particulate material distributed within the thermoplastic polymer, network structure, wherein the weight fraction of soft, ferromagnetic particulate material is from 0.80 and 0.98, based on the total weight of the polymer composite sheet. The solvent may be removed by evaporation, high vapor pressure solvents being particularly suited to this method of removal. However, if the first solvent has a low vapor pressure, a second solvent, of high vapor pressure, may be used to extract the first solvent, followed by evaporation of the second solvent. In some embodiments, at least 10 percent to 100 percent, at least 30 percent to 100 percent, at least 50 percent to 100 percent, at least 60 percent to 100 percent, at least 70 percent to 100 percent, at least 80 percent to 100 percent, at least 90 percent to 100 percent, at least 95 percent to 100 percent or even at least 98 percent to 100 percent by weight of the solvent is removed from the thermoplastic polymer, network structure.

After either the inducing phase separation or after the removing of at least a portion of the solvent step, the formed thermoplastic polymer network structure may be collapsed in order to densify the polymer composite. This may be achieved by applying at least one of a compressive force and a tensile force to the polymer composite, e.g. a polymer composite sheet. In some embodiments, the method of making the polymer composite further includes applying at least one of a compressive force and a tensile force, after the removing the solvent step, thereby densifying the polymer composite sheet. The at least one of a compressive force and a tensile force may be applied by techniques known in the art. For example, a compressive force can be achieved by urging the polymer composite, e.g. polymer composite sheet, through the nip of a pair of nip rolls, e.g. calendaring, the rolls having a gap setting less than the thickness of the polymer composite. Unlike conventional composites, which do not have a thermoplastic polymer network structure, the final density of the polymer composite can be controlled depending on the degree to which the thermoplastic polymer network structure is collapsed, e.g. the nip thickness relative to the polymer composite thickness, in the previous compressive force example. In another example, a tensile force can be applied to the polymer composite, e.g. polymer composite sheet, via a tentering process. Unlike conventional composites, which do not have a thermoplastic polymer, network structure, the final density of the polymer composite can be controlled depending on the degree the thermoplastic network, structure is collapsed, e.g. the amount of stretching of the polymer composite sheet in the tentering process in the previous tensile force example.

When an anisotropic soft, ferromagnetic particulate material is used, the process used to fabricate the polymer composite, e.g. polymer composite sheet, and/or to collapse the polymer composite to densify the polymer composite, may also orient the soft, ferromagnetic particulate material, e.g. soft, ferromagnetic particulate flake material. When the polymer composite is in the form of a polymer composite sheet having a first major surface, the method of making a polymer composite may further include orienting the anisotropic, soft, ferromagnetic particulate material such that the maximum length dimension of the anisotropic, soft, ferromagnetic particulate material are oriented to be within at least 25 degrees, within at least 20 degrees, within at least 15 degrees or even within at least 10 degrees of the adjacent first major surface of the polymer composite sheet. In some embodiments, the maximum length dimension of the anisotropic, soft, ferromagnetic particulate material may be oriented in the machine direction of the process used to fabricate polymer composite sheet. When the polymer composite is in the form of a polymer composite sheet having a first major surface and the soft, ferromagnetic particulate material is soft, ferromagnetic particulate flake material, each flake having a first major surface, the method of making a polymer composite may further include orienting the soft, ferromagnetic particulate flake material such that a majority of the first major surfaces of the flakes are oriented to be within at least 25 degrees, within at least 20 degrees, at least 15 degrees or even within at least 10 degrees of the adjacent first major surface of the polymer composite sheet. In some embodiments, the first major surfaces of the soft, ferromagnetic particulate flake material may be oriented in the machine direction of the process used to fabricate polymer composite sheet.

Select embodiments of the present disclosure include, but are not limited to, the following:

In a first embodiment, the present disclosure provides a polymer composite comprising:

a thermoplastic polymer, network structure; and
a soft, ferromagnetic particulate material distributed within the thermoplastic polymer, network structure, wherein the weight fraction of soft, ferromagnetic particulate material is between 0.80 and 0.98, based on the total weight of the polymer composite and the thermoplastic polymer has a number average molecular weight between $5 \times 10^4$ g/mol to $5 \times 10^7$ g/mol.

In a second embodiment, the present disclosure provides a polymer composite according to the first embodiment, wherein the thermoplastic polymer has a number average molecular weight between $1 \times 10^5$ g/mol to $1 \times 10^7$ g/mol.

In a third embodiment, the present disclosure provides a polymer composite according to the first embodiment, wherein the thermoplastic polymer has a number average molecular weight between $1 \times 10^6$ g/mol to $5 \times 10^6$ g/mol.

In a fourth embodiment, the present disclosure provides a polymer composite according to any one of the first through third embodiments, wherein the thermoplastic polymer, network structure is plastically deformed.

In a fifth embodiment, the present disclosure provides a polymer composite according to the fourth embodiment, wherein the thermoplastic polymer, network structure is plastically deformed by at least one of a compressive force and a tensile force.

In a sixth embodiment, the present disclosure provides a polymer composite according to any one of the first through fifth embodiments, wherein the weight fraction of the soft, ferromagnetic particulate material is between 0.85 and 0.97, based on the total weight of the polymer composite.

In a seventh embodiment, the present disclosure provides a polymer composite according to any one of the first through sixth embodiments, wherein the weight fraction of the soft, ferromagnetic particulate material is between 0.90 and 0.96, based on the total weight of the polymer composite.

In an eighth embodiment, the present disclosure provides a polymer composite according to any one of the first through seventh embodiments, wherein the density of the polymer composite is from 1.5 g/cm$^3$ and 6 g/cm$^3$.

In a ninth embodiment, the present disclosure provides a polymer composite according to any one of the first through eighth embodiments, wherein the density of the polymer composite is between 1.5 g/cm$^3$ and 5.5 g/cm$^3$.

In a tenth embodiment, the present disclosure provides a polymer composite according to any one of the first through ninth embodiments, wherein the soft ferromagnetic particulate material is a soft ferromagnetic particulate flake material, each flake having a first major surface and a thickness normal to the first major surface of the flake.

In an eleventh embodiment, the present disclosure provides a polymer composite according to the tenth embodiment, wherein the flakes of the soft, ferromagnetic particulate flake material have a median diameter, D50, and a median maximum thickness, Tm, and the median aspect ratio, D50/Tm, is between 5/1 to 1000/1.

In a twelfth embodiment, the present disclosure provides a polymer composite according to the tenth or eleventh embodiments, wherein the flakes of the soft, ferromagnetic particulate flake material have median diameter, D50, and the thermoplastic polymer, network structure has a median pore size, P, and D50>2P.

In a thirteenth embodiment, the present disclosure provides a polymer composite according to the twelfth embodiment, wherein D50 is between 25 micrometers to 5000 micrometers and P is between 50 nanometers to 25 micrometers, In a fourteenth embodiment, the present disclosure provides a polymer composite according to any one of the first through thirteenth embodiments, wherein the soft, ferromagnetic particulate material is at least one of Fe—Cr alloys, Fe—Si alloys, FeCoB, Fe based amorphous alloys, nanocrystalline Fe-based oxides, and nanocrystalline Fe-based nitrides, nickel based alloys, CoNbZr and boron based amorphous alloys.

In a fifteenth embodiment, the present disclosure provides a polymer composite according to any one of the first through fourteenth embodiments, wherein the thermoplastic polymer includes at least one of polyurethane, polyester, polyamide, polyether, polycarbonate, polyimide, polysulphone, polyphenylene oxide, polyacrylate, polymethacrylate, polyolefin, styrene and styrene based random and block copolymer, chlorinated polymer, fluorinated polymer, and copolymers of ethylene and chlorotrifluoroethylene.

In a sixteenth embodiment, the present disclosure provides a polymer composite according to any one of the first through fifteenth embodiments, wherein the thermoplastic polymer has at least one melting point from 80° C. to 350° C.

In a seventeenth embodiment, the present disclosure provides a polymer composite according to any one of the first through sixteenth embodiments, wherein the thermoplastic polymer has at least one melting point between 120° C. to 300° C.

In an eighteenth embodiment, the present disclosure provides a polymer composite according to any one of the first through seventeenth embodiments, wherein the polymer composite is in the form of a sheet having a first major surface and a thickness of between 20 micrometers and 5000 micrometers.

In a nineteenth embodiment, the present disclosure provides a polymer composite according the eighteenth embodiment, wherein the soft, ferromagnetic particulate material is a soft, ferromagnetic particulate flake material, each flake having a first major surface and a thickness normal to the first major surface of the flake, wherein a majority of the first major surfaces of the flakes are oriented to be within at least 25 degrees of the adjacent first major surface of the polymer composite sheet.

In a twentieth embodiment, the present disclosure provides a polymer composite according to any one of the first through nineteenth embodiments, wherein the polymer composite is capable of bending to form a radius of curvature of 10 mm when the polymer composite is in the form of a sheet having a thickness between 20 micrometers to 300 micrometers.

In a twenty-first embodiment, the present disclosure provides a polymer composite according to any one of the first through twentieth embodiments, wherein the coercivity of the soft ferromagnetic material is less than or equal to 1000 A/m, optionally wherein the coercivity of the soft ferromagnetic material is between 1 A/m to 1000 A/m.

In a twenty-second embodiment, the present disclosure provides a polymer composite according to any one of the first through twenty-first embodiments, wherein the magnetic saturation induction is between 600 mT to 1000 mT.

In a twenty-third embodiment, the present disclosure provides a polymer composite according to any one of the first through twenty-second embodiments, wherein the magnitude of the relative permeability at 1 MHz is greater than 70.

In a twenty-fourth embodiment, the present disclosure provides a polymer composite according to any one of the first through twenty-third embodiments, wherein the thermoplastic polymer, network structure is produced by an induced phase separation of a miscible thermoplastic polymer-solvent solution, optionally, wherein the induced phase separation is at least one of thermally induced phase separation and solvent induced phase separation.

In a twenty-fifth embodiment, the present disclosure provides a polymer composite according to any one of the first through twenty-fourth embodiments, wherein between 10 percent to 100 percent, by volume, of the porosity of the thermoplastic polymer, network structure is free of liquid and solid.

In a twenty-sixth embodiment, the present disclosure provides a polymer composite according to any one of the first through twenty-fifth embodiments, wherein the volume fraction of soft, ferromagnetic particulate material is between 0.10 and 0.75, based on the total volume of the polymer composite.

In a twenty-seventh embodiment, the present disclosure provides a polymer composite according to any one of the first through twenty-sixth embodiments, wherein between 10 percent to 100 percent, between 30 percent to 100 percent, between 50 percent to 100 percent, between 60 percent to 100 percent, between 70 percent to 100 percent, between 80 percent to 100 percent, between 90 percent to 100 percent, between 95 percent to 100 percent, or even between 98 percent to 100 percent by volume, of the porosity of the thermoplastic polymer, network structure is free of liquid and solid.

In a twenty-eighth embodiment, the present disclosure provides a method of making polymer composite sheet having a first major surface comprising:
  providing a thermoplastic polymer having a number average molecular weight between $5 \times 10^4$ g/mol to $5 \times 10^7$ g/mol, a solvent the thermoplastic polymer is soluble in and, a soft, ferromagnetic particulate material;
  mixing the thermoplastic polymer, solvent and soft, ferromagnetic particulate material to form a miscible thermoplastic polymer-solvent solution containing the soft, ferromagnetic particulate material;
  forming the thermoplastic polymer-solvent solution containing the soft, ferromagnetic particulate into a sheet;
  inducing phase separation of the thermoplastic polymer from the solvent; and
  removing at least a portion of the solvent, thereby forming a polymer composite sheet having a thermoplastic polymer, network structure and a soft, ferromagnetic particulate material distributed within the thermoplastic polymer, network structure, wherein the weight fraction of soft, ferromagnetic particulate material is from 0.80 and 0.98, based on the total weight of the polymer composite sheet.

In a twenty-ninth embodiment, the present disclosure provides a method of making polymer composite sheet according to the twenty-eighth embodiment, wherein the inducing phase separation step includes at least one of thermally induced phase separation and solvent induced phase separation.

In a thirtieth embodiment, the present disclosure provides a method of making a polymer composite sheet according to the twenty-eighth or twenty-ninth embodiments, wherein the mixing step is conducted at temperature between 20° C. to 300° C.

In a thirty-first embodiment, the present disclosure provides a method of making a polymer composite sheet according to any one of the twenty-eighth through thirtieth embodiments, wherein the inducing phase separation step is conducted at a temperature that is between 5° C. to 300° C. below the mixing step temperature.

In a thirty-second embodiment, the present disclosure provides a method of making a polymer composite sheet according to any one of the twenty-eighth through thirty-first embodiments, wherein the forming step is conducted by at least one of extrusion, roll coating and knife coating.

In a thirty-third embodiment, the present disclosure provides a method of making a polymer composite sheet according to any one of the twenty-eighth through thirty-second embodiments, further comprising applying at least one of a compressive force and a tensile force, after the inducing phase separation step or after the removing the solvent step, thereby densifying the polymer composite sheet.

In a thirty-fourth embodiment, the present disclosure provides a method of making a polymer composite sheet according to any one of the twenty-eighth through thirty-third embodiments, wherein the soft ferromagnetic particulate material is a soft ferromagnetic particulate flake material, each flake having a first major surface and a thickness normal to the first major surface of the flake.

In a thirty-fifth embodiment, the present disclosure provides a method of making a polymer composite sheet according to the thirty-fourth embodiment further comprising orienting the soft, ferromagnetic particulate flake material such that a majority of the first major surfaces of the flakes are oriented to be within at least 25 degrees of the adjacent first major surface of the polymer composite sheet.

EXAMPLES

Polymer composites that include a thermoplastic polymer, network structure and a soft, ferromagnetic particulate material were prepared, densified and tested. Dimensional and electromagnetic properties were evaluated along with wireless power transfer efficiency as shown in the following examples. These examples are merely for illustrative purposes only and are not meant to be limiting on the scope of the appended claims. All parts, percentages, ratios, etc. in the examples and the rest of the specification are by weight, unless noted otherwise.

thickness of the film was measured using TMI Model 49-70 Precision Micrometer (available from Testing Machines, Inc. New Castle, Del.). From the area and the thickness of the polymer composite, the volume was calculated. Finally, the mass of the film was measured by using an analytical balance. From the measured mass and volume the density was calculated.

With the known densities of the components (PE density=0.94 g/cm$^3$, MP1 density=6.9 g/cm$^3$) and actual composition (PE=5 wt % and MP1=95 wt %), the theoretical density of the composite without voids (porosity) was calculated. Using the theoretical density and the measured density, the percent void fraction was calculated as:

Percent Void Fraction=[1−(measured density/theoretical density)]×100

From the calculated void fraction, the percent MP1 loading, based on volume, was calculated as follows:

Percent $MP1$ Loading=[$(Mp/\rho_p)/(Mp/\rho_p+Me/\rho_e)$]×(1−Void Fraction)×100 where Mp and Me are mass fractions of MP1 and PE in the composite respectively. Similarly, $\rho_p$ and $\rho_e$ are densities of MP1 and PE respectively.

Electromagnetic Test Methods

I. Static Magnetic Properties:

Polymer composite samples were cut into 6 mm disks prior to the magnetic measurements. A Lake Shore Cryotronics (Westerville, Ohio) vibrating sample magnetometer 7400-S was used to record magnetic hysteresis loops (M-H curves). The magnetizing field H was applied in the plane of the samples. The magnetic field span was set to H=±4 kOe and saturation magnetization Ms was measured at full saturation (|H|=4 kOe). Magnetizing field H was measured with step of 0.14 Oe and coercivity field Hc was defined in vicinity of M=0 via linear fitting based on 6 points on the M-H curve adjacent to M=0.

II. Dynamic Magnetic Properties:

Polymer composite samples were cut into toroids with outer diameter of 18 mm and inner diameter of 5 mm. A Keysight Technologies (Santa Clara, Calif.) magnetic test fixture 16454A and impedance meter E4990A were used to

TABLE 1

| Material Abbreviation | Description |
|---|---|
| CE-1 | Comparative Example 1, a soft magnetic composite available under the trade designation 3M FLUX FIELD DIRECTIONAL MATERIAL EM15TP-010, from 3M Company, St. Paul, Minnesota. |
| MP1 | Sendust particles available under the trade designation MATE-SP3B from Mate Company, Okayama, Japan. |
| PE | Ultra-high molecular weight polyethylene (UHMWPE) available under the trade designation GUR 2126 from Celanese Corp., Irving, TX. |
| MO | White mineral oil, available under the trade designation KAYDOL WHITE MINERAL OIL from Sonneborn, Inc., Parsippany, New Jersey. |
| ES | Fluorochemical solvent available under the trade designation 3M NOVEC 72DE ENGINEERED FLUID from 3M Company. |

Test Methods

Density Measurement Test Method

Dry polymer composite was cut into approximately 8 cm×20 cm strips. Three pieces, each about 6 cm×7 cm, were cut from one large strip for density measurement following ASTM F-1315 (Original: 1990, Reapproved: Mar. 1, 2014) standard. The area of the sample was calculated by cutting the sample with a die with known length and width. The measure real and imaginary part of relative magnetic permeability $\mu_r$. The data were analyzed in accordance with Keysight manual for 16454A.

III. DC Electric Properties:

Polymer composite samples were cut into 18 mm disks for out of plane measurements and ~50×20 mm strips for in-plane measurements. In-plane and out of plane DC resistivities were measured using 2400 Keithley Instruments (Cleveland, Ohio) source meter. The current limit was set to 150 nA. Resistivity ρ was calculated using the equation: R=ρl/S, where R is the measured resistance, l is the distance in the sample through which current travels, and S is the cross-sectional area of the current path.

IV. AC Electric Properties:

In-plane resistivity was measured using microstrip line where polymer composite samples were 3 mm×4 mm strips. The testing was performed in 0.3-20 MHz frequency range. The external magnetic field H=1.6 kOe was applied in the plane of the samples to saturate the sample magnetically and minimize inductive effects. Rohde & Schwarz (Munich, Germany) vector network analyzer ZNB 20 was used to measure resistance of the samples. Out-of-plane resistivity was measured using Keysight Technologies (Santa Clara, Calif.) dielectric test fixture 16453A and impedance meter E4990A using 6 mm diameter sample disks. For both in-plane and out-of-plane measurements resistivity was calculated using R=ρl/S, where R is the measured resistance, l is the distance in the sample through which current travels and S is the cross-sectional area of the current path.

Wireless Power Transfer Efficiency Test Method

The effectiveness of the polymer composite to concentrate and re-direct magnetic flux was evaluated by measuring the total wireless power transfer system efficiency (as opposed to the coil-to-coil power transfer efficiency) at 5 Watts according to Qi-standard, Wireless Power Consortium (WPC) 1.1 Specification. For these measurements, a sample of polymer composite 32 mm×48 mm was used. A test system was custom built using a Qi-Standard compliant 5 Watt Wireless Power Charging Design Kit (Wurth Elektronik (Würth Elektronik GmbH & Co. KG, Germany)/Texas Instruments (Dallas, Tex.) Model: 760308). This design kit includes a Transmitter Coil (Wurth Electronics Model: 760308111) and a Receiver Coil (Wurth Electronics Model: 760308103202). The configuration of the apparatus was as follows: transmitter coil isolator (ferrite sheet 3 mm×52 mm×52 mm), transmitter coil placed on top of isolator, 2.4 mm thick×70 mm×70 mm acrylic sheet placed on top of transmitter coil, receiver coil placed on top of the acrylate sheet, in vertical alignment with the transmitter coil, polymer composite sample placed on top of receiver coil and an approximately 1 mm thick×32 mm×48 mm stainless steel plate (mimicking the battery case) was placed on top of the polymer composite sample. The receiver coil was driven by a DC power supply E3645A from Agilent (Santa Clara, Calif.) set at 5.0 V in a constant voltage mode. The received power was monitored using a DC electronic load, BK Precision Corp. (Yorba Linda, Calif.) 8600 running in constant current mode. To quantify the effectiveness of the magnetic composite material in concentrating and directing the magnetic induction, the sample was laid on top of the receiver coil and an approximately 1 mm thick×32 mm×48 mm stainless steel plate (mimicking the battery case) was placed over the polymer composite sample. The wireless power transfer efficiency is calculated from the measured input and output current and voltages with the output current is set at 0.6 Amp.

$$WPT\ \text{Efficiency}\ (\%) = \frac{(\text{Output Voltage})(\text{Output Current})}{(\text{Input Voltage})(\text{Input Current})} \times 100$$

EXAMPLE PREPARATION

Example 1 (Ex. 1) Polymer Composite Film

MP1 particles and PE were individually weighed to give a total MP1 to PE ratio of 95:5 by weight. Individual components were then dispensed in to the mixing bowl of a Lancaster Mixture (K-Lab, Kercher Industries, Inc., Lebanon, Pa.). The powders were dry blended together for 45 minutes by rotating both the mixing bowl and the shaft at 50% settings. After 45 minutes, mineral oil (MO) was weighed to give solid (PE+MP1) to mineral oil ratio of 63:37 by weight. The mineral oil was slowly dispensed through the multi-orifice port on the top while the powder was mixing. Once all the mineral oil was dispensed, the blend was mixed for another 45 minutes to give a thick, paste like consistency. The blend was then scooped out into a 5 gallon pail. Using a pail loader pump with flow control plate (X20 Graco Inc. Minneapolis, Minn.), the blend was fed into the open barrel zone #2 of a twin screw extruder (25 mm co-rotating twin screw extruder, Berstorff, Germany) at ~204° C. that was connected to an 8 inch (20.3 cm) drop die (Nordson Extrusion Die Industries, Chippewa Falls, Wis. USA) at 177° C. The hot film coming from the die was quenched on a smooth casting wheel at 40° C. The speed of the casting wheel was adjusted to produce films having varying thicknesses, about 0.3 mm to 0.6 mm thick. The mineral oil in these film was then extracted with ES fluid by soaking 8 inch (20.3 cm)×18 inch (45.7 cm) films three times for 20 minutes each in the ES fluid. The ES fluid was subsequently allowed to evaporate from each sample by hanging the film inside a fume hood. This produced the polymer composite of Example 1, Ex. 1, which was then used for further characterization using the test methods listed above and densification. An SEM image of a cross-section of the polymer composite of Ex. 1 is shown in FIG. 1. As seen in FIG. 1, the magnetic flakes in the as prepared sample (prior to densification) are held together by inter-tangled polymer fibrils (thermoplastic polymer, network structure) that were generated during the phase separation process. Ex. 1 has a large void (porosity) fraction.

Example 2 (Ex. 2) Densified Polymer Composite Film

A strip of Ex. 1 was passed through the nip rolls of a calendaring machine with a fixed gap defined between the nip rolls. The nip gap was adjusted until the thickness of the final film was approximately 150 micron. This generated Ex. 2, a densified polymer composite film. This film was then cut into small pieces of 6 cm×7 cm and used for Density Measurements (test Method listed above) and SEM analysis. The SEM cross-sectional image of the densified sample, Ex. 2 (FIG. 2) shows highly packed flakes that are still held together by polymer fibrils. However, most of the voids (porosity) in the film was eliminated during the densification process.

Results

Table 1 below shows the measured thickness, density, void fraction, and volume loading of Sendust flakes (MP1) in the film before, Ex. 1, and after densification, Ex. 2. For comparison, these parameters for CE-1 which has same Sendust flakes with polyurethane as a binder. The loading in the Ex. 2 (Densified Polymer Composite Film) is significantly higher than that in commercial product CE-1. By passing a sample of Ex. 1 multiple times through the nip rolls and/or decreasing the gap between the nips of the calendaring machine, a 100 micron thick film with higher volume loading of up to 68% was demonstrated.

TABLE 1

The volume loading of magnetic particles in magnetic composite films

| Example | Thickness (mm) | Density (g/cc) | Void (%) | MP1 Loading (vol %) |
|---|---|---|---|---|
| Ex. 1 | 0.519 ± 0.29 | 1.39 | 74 | 18.8 |
| Ex. 2 | 0.143 ± 0.007 | 4.67 | 11 | 64.2 |
| CE-1 | 0.10 | 4.1 | 4 | 50 |

Table 2 shows key electro-magnetic properties [DC resistivity, real ($\mu'$) and imaginary ($\mu''$) parts of permeability measured at 6.78 MHz, saturation magnetization (Ms), coercive field (Hc), and loss tangent (Tan($\alpha$))] of the Example films.

TABLE 2

The electromagnetic properties of magnetic composite films

| Example | Resistivity ($\Omega$-m) | $\mu'$ (6.78 MHz) | $\mu''$ (6.78 MHz) | $4\pi$Ms (Gauss) | Hc (Oe) | Tan ($\alpha$) |
|---|---|---|---|---|---|---|
| Ex. 1 | 9.74E+06 | 26 | 2.6 | 2300 | 1.31 | 0.099 |
| Ex. 2 | 8.61E+04 | 82 | 4.7 | 6730 | 4.52 | 0.017 |
| CE-1 | 9.90E+03 | 146 | 29.8 | 5570 | 1.6 | 0.2 |

These results show that the saturation magnetization of the Ex. 2, the densified polymer composite film, is significantly higher than that of CE-1.

TABLE 3

Wireless power transfer efficiency (at ~5 Watts)

| Example | Thickness (mm) | WPT Eff (%) |
|---|---|---|
| Ex. 1 | 0.517 | 65.5 |
| Ex. 2 | 0.144 | 65.2 |
| CE-1 | 0.146 | 69.8 |

What is claimed:

1. A polymer composite comprising:
   a thermoplastic polymer, network structure; and
   a soft, ferromagnetic particulate flake material distributed within the thermoplastic polymer, network structure, each flake having a first major surface and a thickness normal to the first major surface of the flake, wherein the flakes of the soft, ferromagnetic particulate flake material have a median diameter, D50 and the thermoplastic polymer network structure has a median pore size, P, and D50>2P, further wherein the weight fraction of soft, ferromagnetic particulate material is between 0.80 and 0.98, based on the total weight of the polymer composite and the thermoplastic polymer has a number average molecular weight between $5 \times 10^4$ g/mol to $5 \times 10^7$ g/mol.

2. The polymer composite of claim 1, wherein the thermoplastic polymer, network structure is plastically deformed.

3. The polymer composite of claim 2 wherein the thermoplastic polymer, network structure is plastically deformed by at least one of a compressive force and a tensile force.

4. The polymer composite of claim 1, wherein the density of the polymer composite is from 1.5 g/cm$^3$ and 6 g/cm$^3$.

5. The polymer composite of claim 1, wherein the flakes of the soft, ferromagnetic particulate flake material have a median maximum thickness, Tm, and the median aspect ratio, D50/Tm, is between 5/1 to 1000/1.

6. The polymer composite of claim 1, wherein D50 is between 25 micrometers to 5000 micrometers and P is between 50 nanometers to 25 micrometers.

7. The polymer composite of claim 1, wherein the soft, ferromagnetic particulate flake material is at least one of Fe—Cr alloys, Fe—Si alloys, FeCoB, Fe based amorphous alloys, nanocrystalline Fe-based oxides, and nanocrystalline Fe-based nitrides, nickel based alloys, CoNbZr and boron based amorphous alloys.

8. The polymer composite of claim 1, wherein the thermoplastic polymer includes at least one of polyurethane, polyester, polyamide, polyether, polycarbonate, polyimide, polysulphone, polyphenylene oxide, polyacrylate, polymethacrylate, polyolefin, styrene and styrene based random and block copolymer, chlorinated polymer, fluorinated polymer, and copolymers of ethylene and chlorotrifluoroethylene.

9. The polymer composite of claim 1, wherein the thermoplastic polymer has at least one melting point between 120° C. to 200° C.

10. The polymer composite of claim 1, wherein the polymer composite is in the form of a sheet having a first major surface and a thickness of between 20 micrometers and 5000 micrometers.

11. The polymer composite of claim 10, wherein each flake has a first major surface and a thickness normal to the first major surface of the flake, wherein a majority of the first major surfaces of the flakes are oriented to be within at least 25 degrees of the adjacent first major surface of the polymer composite sheet.

12. The polymer composite of claim 1, wherein the polymer composite is capable of bending to form a radius of curvature of 10 mm when the polymer composite is in the form of a sheet having a thickness between 20 micrometers to 300 micrometers.

13. The polymer composite of claim 1, wherein the coercivity of the soft ferromagnetic material is less than or equal to 1000 A/m.

14. The polymer composite of claim 1, wherein the magnetic saturation induction is between 600 mT to 1000 mT.

15. The polymer composite of claim 1, wherein the magnitude of the relative permeability at 1 MHz is greater than 70.

16. The polymer composite of claim 1, wherein the thermoplastic polymer, network structure is produced by an induced phase separation of a miscible thermoplastic polymer-solvent solution, optionally, wherein the induced phase separation is at least one of thermally induced phase separation and solvent induced phase separation.

17. The polymer composite of claim 1, wherein the volume fraction of soft, ferromagnetic particulate flake material is between 0.10 and 0.80, based on the total volume of the polymer composite.

18. A method of making polymer composite sheet having a first major surface comprising:
   providing a thermoplastic polymer having a number average molecular weight between $5 \times 10^4$ g/mol to $5 \times 10^7$ g/mol, a solvent the thermoplastic polymer is soluble in and, a soft, ferromagnetic particulate flake material, each flake having a first major surface and a thickness normal to the first major surface of the flake, wherein the flakes of the soft, ferromagnetic particulate flake material have a median diameter, D50 and the thermoplastic polymer network structure has a median pore size, P, and D50>2P;

mixing the thermoplastic polymer, solvent and soft, ferromagnetic particulate material to form a miscible thermoplastic polymer-solvent solution containing the soft, ferromagnetic particulate material;

forming the thermoplastic polymer-solvent solution containing the soft, ferromagnetic particulate into a sheet;

inducing phase separation of the thermoplastic polymer from the solvent; and removing at least a portion of the solvent, thereby forming a polymer composite sheet having a thermoplastic polymer, network structure and a soft, ferromagnetic particulate material distributed within the thermoplastic polymer, network structure, wherein the weight fraction of soft, ferromagnetic particulate material is from 0.80 and 0.98, based on the total weight of the polymer composite sheet.

19. The method of making polymer composite sheet of claim 18, wherein the inducing phase separation step includes at least one of thermally induced phase separation and solvent induced phase separation.

20. The method of making polymer composite sheet of claim 18, wherein the mixing step is conducted at temperature between 20° C. to 300° C.

21. The method of making polymer composite sheet of claim 20, wherein the inducing phase separation step is conducted at a temperature that is between 5° C. to 300° C. below the mixing step temperature.

22. The method of making polymer composite sheet of claim 18, wherein the forming step is conducted by at least one of extrusion, roll coating and knife coating.

23. The method of making polymer composite sheet of claim 18 further comprising applying at least one of a compressive force and a tensile force, after the removing the solvent step, thereby densifying the polymer composite sheet.

* * * * *